Figure 1:
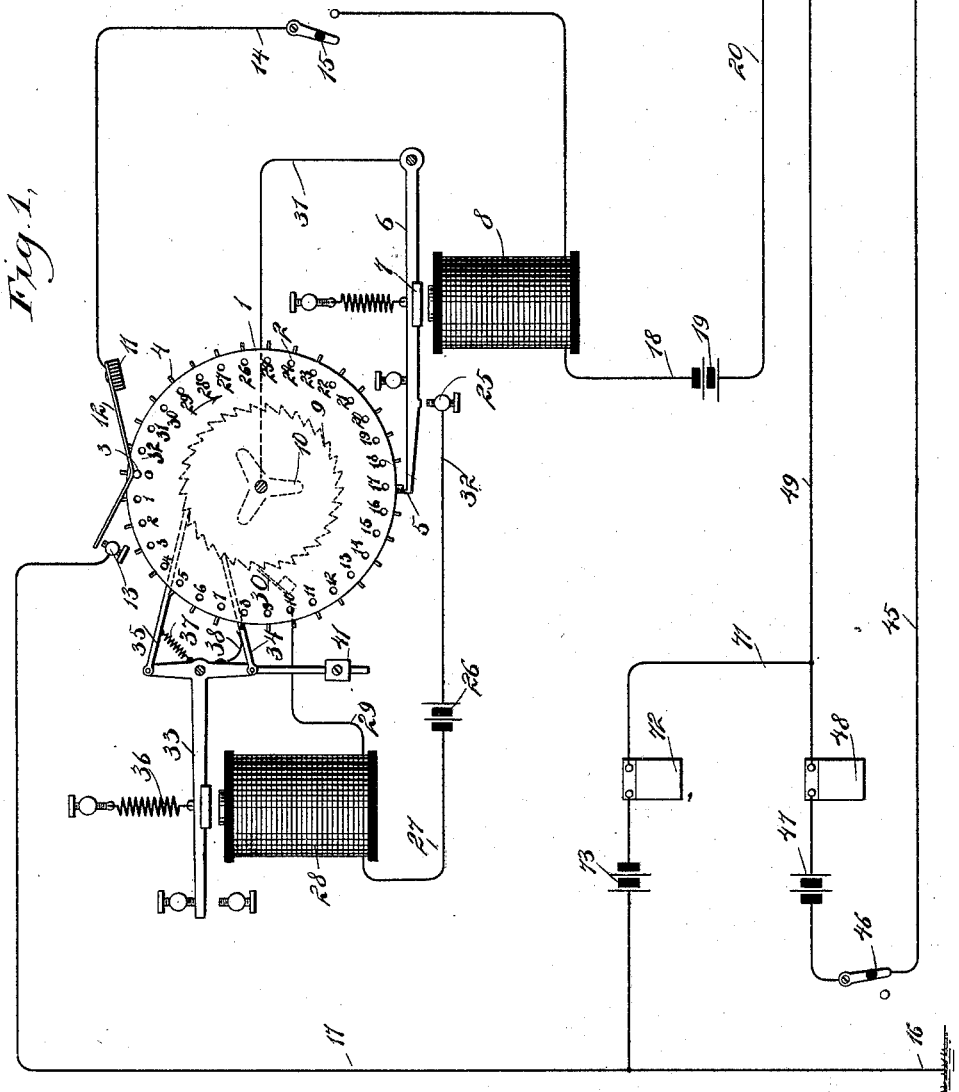

(No Model.) 2 Sheets—Sheet 1.
F. B. TAYLOR, E. E. SALISBURY & A. E. DEAN.
SIGNALING DEVICE.

No. 605,358. Patented June 7, 1898.

WITNESSES:
Edward Thorpe
C. R. Ferguson

INVENTORS
E. E. Salisbury
A. E. Dean
BY F. B. Taylor
ATTORNEYS.

(No Model.) 2 Sheets—Sheet 2.
F. B. TAYLOR, E. E. SALISBURY & A. E. DEAN.
SIGNALING DEVICE.
No. 605,358. Patented June 7, 1898.
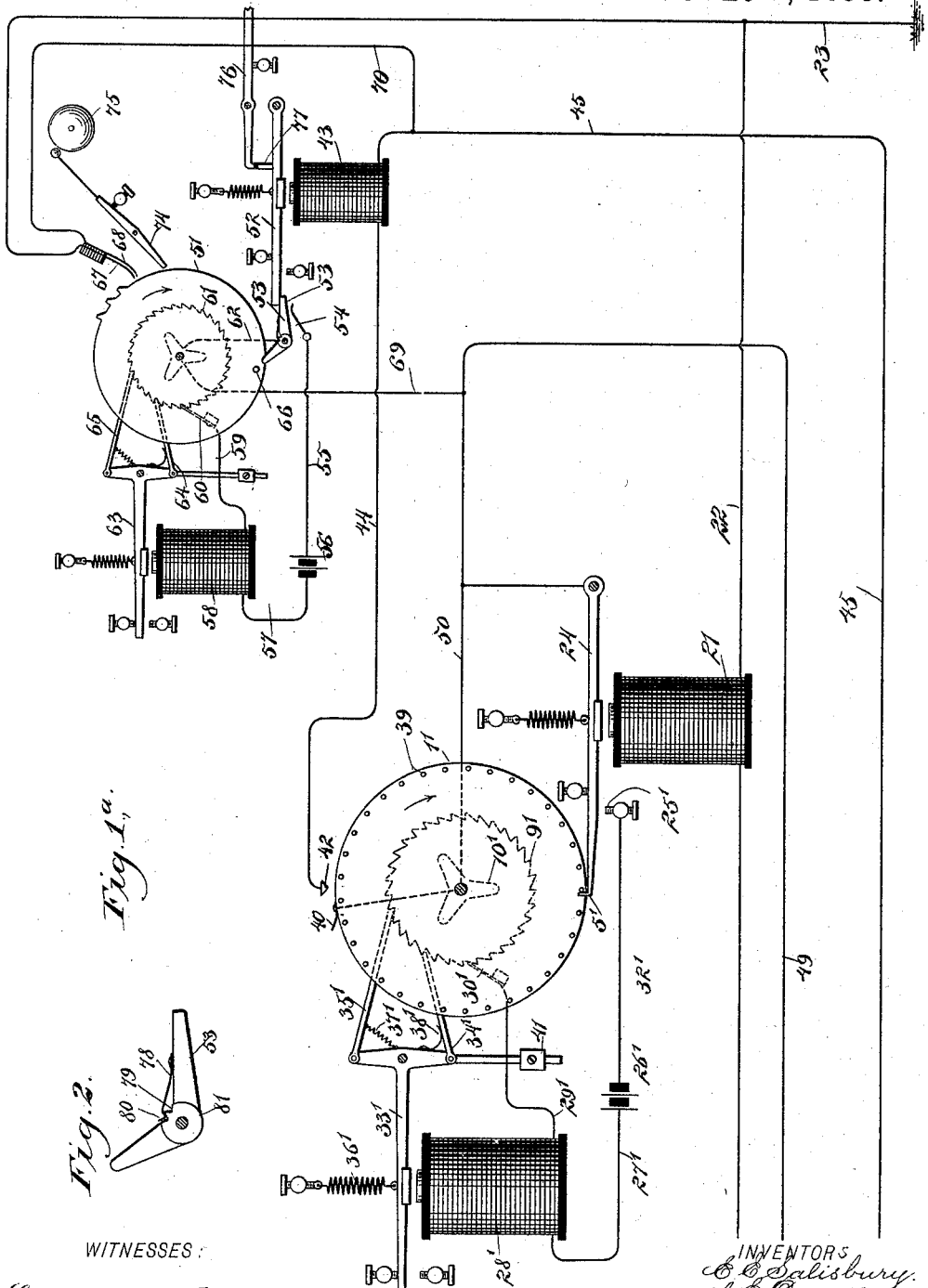
WITNESSES:
Edward Thorpe
C. R. Ferguson
INVENTORS
E. E. Salisbury
A. E. Dean
BY F. B. Taylor
ATTORNEYS

UNITED STATES PATENT OFFICE.

FRANK B. TAYLOR, EDGAR E. SALISBURY, AND ALBERT E. DEAN, OF TACOMA, WASHINGTON.

SIGNALING DEVICE.

SPECIFICATION forming part of Letters Patent No. 605,358, dated June 7, 1898.

Application filed July 23, 1897. Serial No. 645,710. (No model.)

*To all whom it may concern:*

Be it known that we, FRANK B. TAYLOR, EDGAR E. SALISBURY, and ALBERT E. DEAN, of Tacoma, in the county of Pierce and State of Washington, have invented a new and Improved Individual Messenger-Box Controller and Signaling Device, of which the following is a full, clear, and exact description.

The object of this invention is to enable an operator at a central office to automatically turn in any one of a number of outlying call-boxes desired on a single circuit and at the same time signal the subscriber without disturbing or signaling any other subscriber on the circuit. Another object or advantage of this system is that it enables the operator at the central station to test any one of the outlying boxes at will for the purpose of ascertaining whether or not defects of any kind exist in the ground-wire, instrument, or either of the wires leading to the central office without the necessity of sending a lineman or messenger-boy to ring in a box when it is considered essential for the same to be tested, and another object is to provide a system wherein the motors are controlled by armatures adjacent to the rotary parts.

We will describe a device embodying our invention, and then point out the novel features in the appended claims.

Reference is to be had to the accompanying drawings, forming a part of this specification, in which similar characters of reference indicate corresponding parts in all the views.

Figures 1 and 1ª show, diagrammatically, a system embodying our invention; and Fig. 2 shows a lever employed in a call-box, but drawn on an enlarged scale.

The instrument shown in Fig. 1 is designed to be placed in the central office; and it comprises an indicator-wheel 1, having around its periphery a series of holes 2, into either one of which a circuit-breaking plug 3 may be placed. There may be any desired number of holes 2, depending, of course, upon the number of call-boxes in the circuit. In the present case we have shown thirty-three holes, numbered from 0 to 32. Extended radially from the periphery of the wheel 1 is a series of pins 4, equal in number to the holes 2 and arranged in line therewith. These stop-pins 4 are designed to engage with a stop-point 5, which is of insulating material, on a swinging armature-lever 6, carrying an armature 7, coacting with an electromagnet 8. A ratchet-wheel 9 is secured to one side of the wheel 1 or to the shaft thereof, and it contains as many teeth as there are holes 2 in the wheel.

On the shaft of the wheel 1 is a friction-spring 10, which bears with a slight pressure against the wheel 1 or against the ratchet 9 to prevent any backward movement of the wheel 1 and also to render its movement uniform. Secured to a block 11 of insulating material is a spring contact-plate 12, designed to be raised out of contact with the contact-point 13 by means of the plug 3 engaging the said plate. From the contact-plate 12 a wire 14 extends to the electromagnet 8, and this wire is a portion of the controlling-circuit, and in it is located a two-point switch 15, designed to close the controlling-circuit when it is desired to turn in an outlying instrument or signal a subscriber.

When the plug 3 is removed from engagement with the plate 12 and the switch 15 is thrown to its closed position, a continuous circuit is established, beginning at the ground 16, along the wire 17, contact-point 13, contact-spring 12, wire 14, through electromagnet 8, and thence by wire 18 to one pole of the battery 19. From the other pole of the battery 19 a working or controlling wire 20 extends through an electromagnet 21 at the signal-box, and thence through wires 22 and 23 to the ground, which establishes a current through the several signaling-magnets 21 that may be arranged in the circuit, causing the armatures 24, coacting with the magnet 21, and all the similar armatures in the circuit to be attracted by the electromagnet 21. This will cause the armature-lever 6 to make contact with a contact-point 25, at the same time disengaging the stop-point 5 from the pin 4, which permits the wheel 1 to revolve. This establishes a local circuit through the battery 26, wire 27, electromagnet 28, wire 29, spring contact-point 30, ratchet-wheel 9, wire 31, which connects the ratchet-wheel 9 to the armature-lever 6, thence through the armature-lever 6 to the contact 25, and through the wire 32 back to the battery. It will be seen, therefore, that the armature-lever 6 not only provides a stop for the wheel 1, but serves as a circuit-closer for the local circuit.

When the electromagnet 28 is energized, its armature-lever 33 will be drawn downward and cause the lower ratchet-bar 34, pivoted to a downwardly-extended arm of the armature-lever 33 and engaging with a ratchet-wheel 9, to move said ratchet-wheel sufficiently to rotate the wheel 1 a distance equal to one-half the length of one notch of the ratchet-wheel, also causing the upper ratchet-bar 35, pivoted to an upwardly-extended arm of the lever 33 and engaging with the ratchet-wheel 9, to be drawn back sufficiently to drop in the notch following it at the same time the spring-contact 30 drops off a tooth with which it was engaged, thus opening the local circuit and permitting the armature-lever 33 to be drawn upward by a spring 36, causing the movements of the ratchet-bars 35 and 34 to be reversed and the wheel 1 to turn a distance equal to half the length of one notch by reason of the forward motion of the ratchet-bar 35. During this movement the ratchet-bar 34 is drawn back and drops into the notch following, and the spring-contact 30 is again forced in contact with the ratchet-wheel 9, thus closing the circuit to again energize the electromagnet 28, and this motion will continue to rotate the wheel 1 in the direction indicated by the arrow until the armature-lever 6 is released from the electromagnet 8 by reason of opening the circuit from the ground 16 to 23. This is done automatically by the use of the plug 3, as will be hereinafter described. The bar 35 is held yieldingly in engagement with the ratchet-wheel 9 by means of a spring 37, and the bar 34 is held yieldingly in engagement with the ratchet-wheel by means of a spring 38.

Most of the parts in Fig. 1ª coacting with the magnet 21 and the armature-lever 24 are similar to the parts described in connection with Fig. 1, and these like parts we will designate by the same numerals with prime-marks affixed. In this device, however, the wheel 1' has a series of laterally-extended stop-pins 39 to engage with the stop-point 5' of the armature-lever 24. This wheel 1' also has a contact-spring 40 on its periphery at a point directly opposite the number of the subscriber's instrument. The wheels in all instruments are constructed in like manner, except that the spring-contact 40 is fastened to the wheel at different points—that is, at a point directly opposite the number of that particular box or instrument. All of the wheels in the several instruments have the same motion and revolve and stop simultaneously with the wheel 1 by reason of the fact that all of the magnets controlling the wheels are located on the same line. The speed of all the wheels may be regulated to run in unison or at uniform speed by raising or lowering a weight 41 on the depending portion of the motor armature-lever.

It is our object to be able to stop all the wheels or instruments that are controlled by the same circuit at any desired point, and thus by stopping the wheel 1' at a point when the spring 40 is in contact with the contact-point 42 we are enabled to form a metallic circuit through an electromagnet 43 by means of the wires 44 and 45 to the switch-point 46, through the battery 47 and regular call-box 48, then over the wires 49 and 50 to the wheel 1', and thence to the spring 40 and the contact-point 42, thus completing the signaling-circuit, which enables the operator to turn in from the central office that particular box on the circuit at which the metallic circuit is thus formed and permit the operation of the motor for the wheel 51 in the call-box in a manner hereinafter described.

Before attempting to cut in any one of the call-boxes on the circuit for the purpose of ringing in the same or signaling a subscriber the operator at the central office should first throw the switch 46 to its open position, which breaks the signaling-circuit. This is done to avoid turning in or signaling automatically any one of the smaller-numbered boxes not desired by reason of closing the circuit at the call-box when the spring 40 momentarily contacts with the contact-point 42 while passing the same during the revolution of the wheel 1'. In order to cut in the call-box shown in the drawings, which is No. 3 of the series, it will be necessary for the operator at the central office after throwing the switch to its open position to pull the plug 3 from its present position at "0" in the wheel 1 and insert it in the hole No. 3. Then the switch 15 is to be thrown to its closed position, and this will close the controlling-circuit through all the electromagnets 8 21, &c., which will draw down the armature-levers of the respective electromagnets. All the wheels will then turn in the direction indicated by the arrow at the same speed until the plug 3, carried by the central-office indicator-wheel 1, engages with the spring 12 and lifts said spring from the contact-point 13, thereby automatically opening the controlling-circuit, causing all the armatures 24 and also the armature 6 at the central office to be released and drawn up by suitable springs, which engage their stop-points with stop-pin No. 3 in all instruments excepting that at the central office, causing all the wheels 1', &c., in the controlling-circuit to stop at the same relative position. The stop-point on the armature 6 at the central office engages with the pin on the opposite side of the wheel to the hole 2 occupied by the plug 3.

The contact-spring 40 in each instrument, excepting the one controlling call-box No. 3, is attached to the edge of its wheel at a point where it will not form permanent contact with its contact-point 42 when the wheels are stopped at pin No. 3. The spring 40 of box No. 3 only is brought into permanent contact with its contact-point 42 and closes the signaling-circuit. Then by throwing the switch 46 to its closed position a metallic circuit is formed and a current established through the electromagnet 43, attracting its armature-lever 52, and the downward movement of this armature-lever 52 will rock a pivoted angle-lever 53 into engagement with the contact-spring 54, closing a local circuit from said contact 54 over a wire 55, through the battery 56, wire 57, electromagnet 58, wire 59, contact-spring 60, ratchet-wheel 61, wire 62, and lever 53, which causes the motor-armature 63 to operate the wheels 61 and 51, by means of the ratchet-bars 64 and 65, in a manner described for the other ratchet-bars. The motion of the wheel 51 will continue until the local circuit is broken by means of a pin 66, projected laterally from the wheel 51, passing around and engaging with the upwardly-disposed member of the lever 53, to thus rock the lever and lift it from the spring-contact 54. The wheel 51 is provided on its periphery with a series of projections corresponding to the number of the box. In this particular box there will of course be three projections, as shown. During the rotary movement of the wheel 51 the projections will engage with and make intermittent contact between the brushes 67 and 68, closing the call-box circuit from the point of contact through the wheel 51, over the wire 69, through the wire 49, to which the wire 69 is connected, through the relay 48 to the battery 47, thence over wire 45 and the wire 70, connecting the wire 45 with the brush 68. The brush 67 is connected with the ground-wire 23, and as the projections on the wheel 51 make intermittent contact with the brush 67 the circuit will be established through the ground-wire 23, brush 67, through either the wheel 51 or brush 68, thence over either wires 69 and 49 or 70 and 45 to a point where the wire 71 intersects with the wire 49, over said wire 71, through extra call-box 72, through battery 73, and thence to ground 16. These intermittent groundings and closings of the call-circuit corresponding to the number of the instrument cause the extra and regular call-boxes 72 and 48 at the central office to respond, registering the number of the box in the ordinary manner.

As the wheel 51 in the call-box No. 3 revolves the projection on the wheel will engage the extended end of the bell-striker lever 74, depressing the same slightly as each projection passes, causing a hammer at the end of the lever to rise and fall a number of times corresponding to the number of the instrument and striking a bell 75, signaling the number of the box.

As soon as the wheel 51 commences to revolve by reason of closing the call-circuit at switch 46 the wheels 1 and 1' and all other wheels of the kind located in the controlling-circuit must be restored to their normal position, as indicated in the drawings. This is done by removing the plug 3 from the hole in the central-office indicator-wheel and placing said plug in the hole "0," which causes and permits all wheels in the controlling-circuit to revolve as before until automatically stopped by reason of the plug 3 engaging with the spring-contact 12 and raising said contact-plate to open the controlling-circuit.

The subscribers can also turn in their boxes when desired by rocking a lever 76, which extends outward through the call-box, and the inner end of this lever will engage with a pin 77, secured to the armature-lever 52, and a continued upward movement of the outer lever 76 will force the armature of the lever 52 downward, and this downward movement of the armature-lever will turn the lever 53 into engagement with the spring-contact 54, thus closing the local circuit, which causes the wheel 51 to make one revolution in the manner heretofore described and signaling the central office on both regular and extra call-boxes the number of the box thus turned in. The speed of the motor for the wheel 51 will be regulated by a weight, as heretofore described in connection with the other motors.

The angle-lever 53 is provided with a retarding device, which is plainly shown in Fig. 2. This retarding device consists of a spring 78, fastened to one arm of the lever 53 and designed to engage in either one of two notches 79 or 80, made in the upper edge of a collar 81, secured to the pin upon which the lever 53 is mounted to rock. This spring 78 will hold the lever 53 yieldingly in either one of its adjusted positions.

When it is desired to ring in box No. 3 and signal the subscriber and all the wheels operated by the controller-circuit are stopped at pin 3, the spring 40 makes contact with the contact-point 42 in instrument No. 3 only. When the wheels are all in this position, the spring in box No. 2 corresponding with the spring 40 will have passed its contact-point corresponding to the contact-point 42 and the springs in all other boxes will not have reached this point. The signaling-circuit is open at the switch 46 when the wheels in the controlling-circuit are being turned. Consequently the momentary closing of the signaling-circuit at the call-boxes by reason of the spring 40 passing the contact-point 42 in the different instruments does not affect the armature-lever 52 in call-box No. 3, because there is no current passing through the electromagnet 43 by reason of the fact that switch 46 stands at its open position, which leaves the signaling-circuit open at the central office.

Having thus described our invention, we claim as new and desire to secure by Letters Patent—

1. A controlling device for an electric circuit, comprising a wheel having a number of stop-pins, an armature-lever adapted to engage with the respective stop-pins, an electromagnet located in a main circuit and coacting with said armature-lever, a local circuit in which the armature-lever is comprised and for which it serves as a circuit-closer, and a motor in the local circuit for operating the wheel, substantially as specified.

2. In a call-box, a controlling-wheel having a number of stop-pins, an armature-lever adapted to engage with the respective stop-pins, an electromagnet located in the main circuit at the central office and coacting with said armature-lever and a local circuit in which the armature-lever is comprised, the said armature-lever also forming an opening and closing switch for said local circuit, an electromagnet in said local circuit, a motor armature-lever coacting with said electromagnet, a ratchet-wheel movable with the stop-wheel, and a pair of ratchet-bars pivotally connected to the armature-lever and having yielding engagement with the ratchet-wheel, substantially as specified.

3. A central-office controlling device for an electric circuit having a number of call-boxes, comprising an indicator-wheel having a series of holes near its periphery, a series of pins extended radially from the periphery of the wheel, the number of pins being equal to that of the number of holes, a plug for insertion into either one of said holes, a spring contact-plate in the main circuit and adapted to be moved by said plug to break the circuit, an armature-lever actuated by the current through the main circuit, a local circuit in which said armature-lever is comprised, the said armature-lever forming a circuit-closer for the local circuit and also providing a stop for the indicator-wheel by engaging with one of its pins, an electromagnet in said local circuit, a motor armature-lever coacting with said electromagnet, a ratchet-wheel carried by the indicator-wheel, spring-pressed ratchet-bars pivotally connected to extensions from the motor armature-lever and engaging with the ratchet-wheel, and a retarding device for the wheels, substantially as specified.

4. In a call-box located in an electric circuit controlled from a central station, a wheel having a series of stop-pins, a contact-plate carried by said wheel, a motor located in a local circuit for rotating said wheel, a call-wheel having projections on its periphery corresponding to the number of the box, a local circuit for operating a motor to rotate said call-wheel, an armature-lever for closing said local circuit, and an electromagnet for drawing said armature to its closing position, the said electromagnet being located in the same circuit, the circuit through which is closed by the contact-plate carried by the first-named wheel, substantially as specified.

5. In a call-box, the combination with an electric circuit controlled from a main office, of a circuit-closing wheel, a motor for operating said wheel, comprising an electromagnet in a local circuit controlled from the main circuit, an armature-lever coacting with said electromagnet, a ratchet-wheel connected to the circuit-closing wheel, a ratchet-bar extended from the ratchet-wheel to a downwardly-extended arm of the armature-lever, another ratchet-bar extended from the ratchet-wheel to an upwardly-extended arm of the armature-lever, an adjustable pendulum-like governor for the motor, carried by the armature-lever, and a contact-plate having connection with the electromagnet and adapted for intermittent contact with the ratchet-wheel, to open and close the circuit through the electromagnet, substantially as specified.

FRANK B. TAYLOR.
EDGAR E. SALISBURY.
ALBERT E. DEAN.

Witnesses to the signature of Frank B. Taylor:
    JNO. M. RITTER,
    C. R. FERGUSON.

Witnesses to the signatures of Edgar E. Salisbury and Albert E. Dean.
    F. H. MURRAY,
    FRANK S. CARROLL.